United States Patent Office 3,109,851
Patented Nov. 5, 1963

3,109,851
VINYLPHENYLMETAL COMPOUNDS
Hugh E. Ramsden, Scotch Plains, N.J., assignor, by mesne assignments, to M & T Chemicals Inc., New York, N.Y., a corporation of Delaware
No Drawing. Filed Mar. 16, 1959, Ser. No. 799,456
22 Claims. (Cl. 260—433)

The present invention relates to novel organometallic compounds and to a process for preparing the same. This application is a continuation-in-part of co-pending Serial Nos. 671,374, now abandoned; 671,375, now abandoned; and 671,376, all filed July 12, 1957, and all continuations-in-part of Serial No. 549,571, filed November 28, 1955, in turn a continuation-in-part of Serial No. 520,145, filed July 5, 1955, both now abandoned.

It is an object of the present invention to provide novel organometallic compounds.

Another object of the present invention is to provide a process for the preparation of novel organometallic compounds.

Other objects and advantages of the invention will become apparent from the following description and claims.

The present invention contemplates providing novel vinylphenylmetal compounds illustrated by the general formula $V_aMZ_{y-a}$ wherein M is a metal selected from the class consisting of beryllium, zinc, cadmium, mercury, boron, aluminum, germanium, lead, phosphorus, arsenic, antimony and bismuth; V is a vinyl-substituted phenyl radical bonded to the metal M through a carbon atom of the phenyl ring; Z is a radical selected from the class consisting of halogen atoms and organic groups; $y$ is the valence of the metal M and is an integer from 2 to 4; and $a$ is an integer from 1 to $y$. When more than one vinylphenyl radical is attached to the metal, they can be the same or can differ in the position of the vinyl group on the phenyl ring and/or in the nature of other ring substituents. When more than one Z group is attached to the metal atom, they also can be the same or different.

These novel vinylphenylmetal compounds are prepared in high yield by reacting a metal M compound with a vinylphenylmagnesium chloride that has been prepared in the presence of a 5- or 6-membered, non-aromatic cyclic ether, hereafter designated compound Q. When a vinylphenylmagnesium chloride is thus prepared and utilized in the presence of said compound Q, the reaction between the vinylphenylmagnesium chloride and the reactive metal compound proceeds smoothly to give good yields of the vinylphenylmetal compounds.

The general process contemplated by the present invention is illustrated by the following equation:

(1)
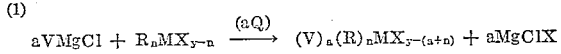

wherein V, M and $y$ are as previously defined; R is an organic group; X is a halogen radical, and when M is boron and aluminum, X can also be alkoxy and aryloxy groups; $n$ is an integer from 0 to $(y-1)$; $a$ is an integer from 1 to $(y-n)$; and $(a+n)$ is not greater than $y$. The symbol Q placed over the arrow designates that a compound Q, more completely defined hereinafter, is present in the reaction mixture. The symbol also indicates that compound Q is present in a quantity at least molecularly equal to the quantity of vinylphenylmagnesium chloride reactant used.

As illustrated by Equation 1, the reactive metal M compounds employed in the present process contain at least one group, bonded directly to the metal atom, which is capable of being replaced by the vinylphenyl residue of the vinylphenylmagnesium chloride reactant. For the metal reactant to operate in the process of this invention, this is the sole requirement. The metal reactants can be classified, generally, as metal halides, organometallic halides, metal alkoxides, metal aryloxides, organometallic alkoxides and organometallic aryloxides. The preferred metal reactants are the metal chlorides and the organometallic chlorides. When the metal reactant is an organometallic reactant, the nature of the organo R-groups attached to the metal is not critical, and any organometallic compound having the requisite reactive X-group directly bonded to the metal atom is suitable. Of course, if the R-groups contain substituents reactive with Grignard-type reagents, sufficient vinylphenylmagnesium chloride reactant must be used to satisfy both the reactive R-group substituent as well as at least one of the reactive X-groups. Consequently, for reasons of economy, R-groups containing non-reactive substituents, as for example, hydrocarbon R-groups, are to be preferred.

The vinylphenylmagnesium chlorides which are utilized to prepare the novel vinylphenyl metal compounds by the present process are characterized by the general formula VMgCl wherein Mg and Cl represent the magnesium atom and the chloride radical, respectively, and V represents a vinylphenyl radical. The vinylphenyl radical is further characterized in that the vinyl group is bonded directly to a carbon atom of the phenyl ring at either the ortho, meta, or para position relative to the magnesium atom. The phenyl ring can otherwise be unsubstituted, or any or all of the remaining four positions of the phenyl ring may be substituted by the same or different substituents. Of course, these substituents on the phenyl ring are not reactive under the process conditions with the vinylphenylmagnesium chloride or other components of the reaction mixture and/or products, i.e., the phenyl ring is otherwise inertly substituted. Illustrative of the types of suitable substituents are hydrogen, fluorine, chlorine, alkyl groups such as methyl, ethyl, propyl, amyl, lauryl, octadecyl, etc.; alkenyl groups such as vinyl, propenyl, butenyl, etc.; aryl groups such as phenyl, naphthyl, tolyl, xylyl, xenyl, etc.; aralkyl and alkaryl groups such as benzyl, phenylethyl, cinnamyl, methylbenzyl, etc.; heterocyclic groups such as thienyl, thenyl, furfuryl, etc.; alkoxy and aryloxy groups such as methoxy, ethoxy, propoxy, allyloxy, phenoxy, tolyloxy, xenyloxy, etc.; and dialkylamino such as dimethylamino, diethylamino, dipropylamino, etc. Polyvalent radicals whose free bonds are joined together to form used ring radicals are also among the suitable substituents groups. The vinylphenylmagnesium chlorides utilized in the present invention are prepared from the corresponding vinylphenyl chloride by the general procedure described for arylmagnesium chlorides in my co-pending application, Serial No. 698,045.

The following equations further illustrate the wide variety of vinylphenylmetal compounds preparable by the present process:

(2)
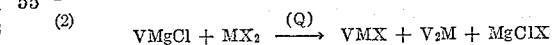

(3)
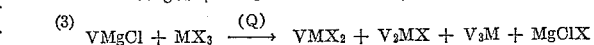

(4)
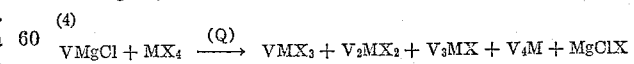

wherein V, M, X, and Q are as defined hereinbefore. The Equations 2, 3 and 4 have been left unbalanced since by selecting appropriate ratios of reactants, any of the products or mixtures of the products illustrated may be prepared. For example, if all the X-groups are to be replaced by vinylphenyl radicals, an excess of vinylphenylmagnesium chloride reactant is used. Furthermore, it is possible to carry out the reaction stepwise. The $MX_2$, $MX_3$, or $MX_4$ compound can be reacted with an amount of any organomagnesium halide reactant less than that required to replace all the X-groups, and then the product of that reaction can be further reacted with a vinylphenylmagnesium chloride. In a similar manner, vinylphenylmetal compounds containing differently substituted vinylphenyl radicals are prepared by replacing part of the X-groups with one type vinylphenyl radical, and subsequently replacing all or part of the remaining X-groups with another type vinylphenyl radical.

If all the reactive groups of the metal reactant are to be replaced by vinylphenyl radicals, the metal reactant, which can be dissolved in an inert solvent, is preferably added to the vinylphenylmagnesium chloride, usually dissolved in an excess of compound Q. If only part of the reactive groups of the metal reactant are to be replaced by vinylphenyl radicals, the vinylphenylmagnesium chloride in compound Q is preferably added to the metal reactant. During the addition of reactants, the reaction mixture is preferably agitated.

Since the reaction of the vinylphenylmagnesium chloride with the metal reactants is exothermic, the reaction temperature will vary with the reactants and solvents utilized, and with the products desired. In general, the reaction temperature is usually between room temperature and the reflux temperature of the reaction mixture. It may be desirable and/or necessary in certain instances to conduct the reaction at lower temperature, i.e., when the reaction proceeds very rapidly at higher temperatures or when reactants which are normally gaseous are employed.

The reaction is preferably carried out in an inert atmosphere since many of the organometallic compounds rapidly react with atmospheric oxygen and moisture. It is also preferable that reactants and solvent be prepared in an inert atmosphere. Nitrogen gas provides a suitable inerting atmosphere.

In a preferred form of the process of this invention, the vinylphenylmagnesium chloride reactant is used in the form of a solution in compound Q. This is preferred since the reactant is readily and economically prepared by the reaction of a vinylphenyl chloride with magnesium in the presence of a compound Q. The resulting solution which contains etherate-type complexes of compound Q and vinylphenylmagnesium chloride, can be used as a reactant in the present process. However, it is not a requirement of the process that a solution of the vinylphenylmagnesium chloride in compound Q be used. After the reagent has been prepared in compound Q, excess compound Q present merely as a solvent can be replaced by other inert solvents, e.g., ethylene polyethers, or aliphatic, cycloaliphatic, or aromatic hydrocarbon solvents such as heptane, cyclohexane, toluene, hexane, pentane, octane, isooctane, cumene, xylene, etc. A mixture of compound Q and of said inert solvents also forms a suitable reaction medium for carrying out the process of this invention.

The reactive metal compounds used in this invention can be introduced per se into the reaction mixture or can be dissolved in a suitable solvent such as a compound Q or one of the other inert solvents mentioned above. Where the reactive metal compound is an insoluble material, such as an insoluble metal salt, it can conveniently be employed as a slurry or suspension in the liquid medium.

Where a solvent is utilized in the process, it must of course, be inert to the other components of the reaction mixture under the process conditions, and is preferably an organic solvent which boils below about 150–160° C. The preferred solvents include substituted and unsubstituted tetrahydrofurans, tetrahydropyrans, heptanes, hexanes, pentanes, octanes, cumene, xylene, etc. A solvent system containing more than one component can also be used. Tetrahydrofuran is an especially preferred solvent.

The reaction products of the present invention include one or more vinylphenylmetal compounds, a magnesium halide salt, compound Q, and other inert solvent if used. These may be separated by conventional means, e.g., hydrolysis, solvent extraction, filtration, distillation, etc. The desired vinylphenylmetal product is generally isolated by distillation at reduced pressure.

As previously disclosed herein, the presence of a compound Q is required in the present invention to enable the desired vinylphenylmetal compounds to form smoothly and in superior yields. While I do not know the manner in which compound Q influences the reaction, I believe that in addition to its usefulness as a solvent, compound Q coordinates with the vinylphenylmagnesium chloride reactant to form a reactive intermediate. Such intermediates may inhibit the formation of polymeric materials either during the formation of the vinylphenylmagnesium reactants or during their subsequent reaction with the reactive metal compounds.

Compound Q as used in this description of the invention is a cyclic ether selected from the class consisting of tetrahydrofurans, tetrahydropyrans, dihydropyrans, tetrahydrofurfuryl ethers, and N-alkylmorpholines. Cyclic ethers which satisfy the requirements of compound Q are those containing 5 and 6 members in the cyclic ring and wherein:

(a) there is only one oxygen atom in the ring,
(b) the other ring atoms are carbon,
(c) one ring carbon separated from the oxygen atom in the ring by two carbon atoms can be replaced by an alkyl-substituted nitrogen atom,
(d) the ring contains at most one double bond,
(e) at least one carbon atom adjacent the oxygen atom in said ring being free of any substituents other than hydrogen.

It is contemplated that compound Q can be substituted with groups which are not reactive with organomagnesium chlorides, or with any of the other components and products of the reaction mixtures of the present process. This includes substituted and unsubstituted alkyl, aryl, alkoxy and aryloxy groups (all allowable substituents on such groups also being unreactive with other components of the reaction mixture as specified hereinbefore). When nitrogen replaces a carbon atom in the ring, the nitrogen atom must be substituted with a group, such as an alkyl group, which is unreactive with the reactants or reaction products. Of the cyclic ethers within the above description and definition of compound Q, those which are preferred are tetrahydrofuran, tetrahydropyran, dihydropyran, 2-methyltetrahydrofuran, 2-ethoxytetrahydropyran, tetrahydrofurfuryl ethyl ether, and N-methylmorpholine.

One of the inherent properties of compound Q is that the oxygen is available for electron donation, i.e., the free p-electrons present on the oxygen are available, for coordination with the vinylphenylmagnesium chloride. Any large blocking groups on the carbon atoms adjacent to the ring oxygen may impair the availability of these electrons and the reactivity of the compound Q for forming a coordinated reactive intermediate with the vinylphenylmagnesium chloride, and thus assisting in the reaction. In addition to the compounds listed above as being suitable for compound Q, other compounds satisfying the requirements for this coordinating agent and solvent will be apparent to those skilled in the art from the teachings of the present specification, and are intended to be considered as equivalents. Since compound Q also apparently functions as a solvent, a compound Q which has a high melting point may still function in this invention, but if it is used as the solvent, obviously a high melting point (e.g., above 90° C.) causes great difficulty in carrying out the reaction.

The following examples are further illustrative of the present invention. It is to be understood, however, that this invention is not restricted thereto.

*Example 1.—p-Vinylphenylmagnesium Chloride*

A reactor was charged with 9.7 grams (0.4 g. atom) of magnesium and 3 ml. of ethyl bromide and 5 ml. of tetrahydrofuran. The reaction of the magnesium initiated immediately and the temperature rose to about 60° C. A separately prepared mixture of 27.6 grams of p-chlorostyrene and 50 ml. of tetrahydrofuran was introduced to the reaction mixture drop-wise over a period of 35 minutes at a rate sufficient to maintain gentle reflux. The vapor temperature rose to about 78–82° C. After this addition, refluxing was continued for 15 minutes, and then the mixture was stirred for 45 minutes without heating. The product was p-vinylphenylmagnesium chloride.

*Example 2.—o-Vinylphenylmagnesium Chloride*

By using o-chlorostyrene in place of p-chlorostyrene in the procedure of Example 1, o-vinylphenylmagnesium chloride is prepared.

*Example 3.—m-Vinylphenylmagnesium Chloride*

By using m-chlorostyrene in place of p-chlorostyrene in the procedure of Example 1, m-vinylphenylmagnesium chloride is prepared.

*Example 4.—p-Vinylphenylzinc Chloride*

One mole of p-vinylphenylmagnesium chloride in excess tetrahydrofuran is added slowly and under an atmosphere of nitrogen to a stirred slurry of anhydrous zinc chloride (1 mole) in tetrahydrofuran. The mixture is heated to reflux after the addition is completed, and maintained at reflux temperature for six hours thereafter. The mixture is then cooled and pentane solvent is added. The magnesium salts which precipitate are removed by filtration under nitrogen. The p-vinylphenylzinc chloride is separated from the solvents by vacuum distillation of the solvents.

In the same manner, other vinylphenylmetal halides are prepared as shown in the following table:

| Example No. | Vinylphenyl-MgCl | Metal halide | Reaction Medium | Vinylphenyl-metal Product |
|---|---|---|---|---|
| 5 | o-vinylphenyl | $BeBr_2$ | tetrahydrofuran | o-vinylphenyl-beryllium bromide |
| 6 | m-vinylphenyl | $CdCl_2$ | do | m-vinylphenyl-cadmium chloride |
| 7 | o-vinylphenyl | $HgCl_2$ | 2-ethoxy-tetrahydropyran | o-vinylphenyl-mercuric chloride |
| 8 | 2-methyl-4-vinylphenyl | $ZnI_2$ | tetrahydrofurfuryl ethyl ether | 2-methyl-4-vinylphenyl zinc iodide |

*Example 9.—Bis-(p-Vinylphenyl)Zinc*

One mole of p-vinylphenylmagnesium chloride in excess tetrahydrofuran is slowly added to a stirred slurry of anhydrous zinc chloride (0.5 mole) in tetrahydrofuran. The mixture is heated to reflux after the addition is complete, and thereafter for about 4–5 hours. Pentane solvent is then added to the cooled mixture and the magnesium salts filtered out under nitrogen. Bis-(p-vinylphenyl)zinc is isolated by distillation under vacuum, using a molecular still.

By following the procedure of Example 9, other bis-(vinylphenyl)metal compounds are prepared from the following reactants:

| Example No. | Vinylphenyl MgCl | Metal halide | Bis(vinylphenyl) metal compound |
|---|---|---|---|
| 10 | 2-methyl-4-vinylphenyl | $BeCl_2$ | Bis(2-methyl-4-vinylphenyl)-beryllium |
| 11 | 3-propyl-4-vinylphenyl | $AlCl_3$ | Bis(3-propyl-4-vinylphenyl)-aluminum chloride |
| 12 | 2-chloro-4-vinylphenyl | $SbCl_3$ | Bis(2-chloro-4-vinylphenyl)-antimony chloride |
| 13 | 2-methoxy-4-vinylphenyl | $BiCl_3$ | Bis(2-methoxy-4-vinylphenyl)-bismuth chloride |

*Example 14.—o-Vinylphenylethylberyllium*

To a solution of 1 mole of ethylberyllium bromide in tetrahydrofuran is added 1 mole of o-vinylphenylmagnesium chloride in tetrahydrofuran. The mixture is refluxed for 1 hour after the addition is completed. The reaction mixture is then hydrolyzed, and the aqueous and organic layers are separated. o-Vinylphenylethylberyllium is recovered by vacuum distillation.

*Example 15.—m-Vinylphenylbutylcadmium*

By replacing the methylberyllium bromide with butylcadmium chloride and the o-vinylphenylmagnesium chloride with m-vinylphenylmagnesium chloride in Example 14, m-vinylphenylbutylcadmium is obtained.

*Example 16.—o-Vinylphenyldodecylmercury*

By using dodecylmercuric chloride and o-vinylphenylmagnesium chloride in the procedure of Example 14, o-vinylphenyldodecylmercury is obtained.

*Example 17.—2-Methyl-4-Vinylphenylallylzinc*

By the procedure of Example 14, 2-methyl-4-vinylphenylallylzinc is obtained from allylzinc iodide and 2-methyl-4-vinylphenylmagnesium chloride.

*Example 18.—p-Vinylphenyloctylphosphorus Chloride*

One mole of the octylmagnesium chloride in 2-methyltetrahydrofuran is slowly added to 1 mole of phosphorus trichloride dissolved in heptane. After completion of the addition, the mixture is refluxed for one hour, and then a 2-methyltetrahydrofuran solution containing p-vinylphenylmagnesium chloride, prepared from 1 mole of p-vinylphenyl chloride, is added slowly with stirring. 2-methyltetrahydrofuran and heptane are distilled off, and the p-vinylphenyloctylphosphorus chloride is recovered by vacuum distillation.

*Example 19.—Bis(p-Vinylphenyl)Octylphosphine*

The procedure of Example 18 is followed except that 2 moles of p-vinylphenylmagnesium chloride in dihydropyran are used. The mixture is refluxed for 2 hours, hydrolyzed, and the aqueous and organic layers separated. After the solvents are removed by distillation, the bis(p-vinylphenyl)octylphosphine is distilled under reduced pressure.

*Example 20.—Tris(p-Vinylphenyl)Phosphine*

One mole of phosphorus trichloride in 1 liter of tetrahydrofuran is added to a tetrahydrofuran solution containing 3 moles of p-vinylphenylmagnesium chloride. The mixture is refluxed for about 5 hours after the addition is complete. After the mixture is hydrolyzed with cold water and the organic layer separated, the solvent is distilled off to yield the tris(p-vinylphenyl)phosphine.

*Example 21.—Tris(p-Vinylphenyl)Arsine*

Three moles of p-vinylphenylmagnesium chloride in tetrahydropyran is slowly added to 0.8 mole of arsenic trichloride in heptane. After the addition is completed it is necessary to externally heat the mixture to maintain the temperature at about 90° C. The mixture is heated and stirred for a period of about 4 hours. Water is added slowly to dissolve the precipitated magnesium chloride. The organic layer is separated and filtered, and the solvents removed by distillation. The tris(p-vinylphenyl)arsine may be recrystallized from xylene.

*Example 22.—Tris(m-Vinylphenyl)Bismuth*

By substituting bismuth trichloride and m-vinylphenylmagnesium chloride in the procedure of Example 21, tris(m-vinylphenyl)bismuth is prepared.

*Example 23.—p-Vinylphenyldivinylaluminum*

A solution of 2 moles of vinylmagnesium chloride in tetrahydrofuran is added to a slurry of 1 mole of aluminum chloride in ligroin B.P. 35° to 60° C.) portionwise at such a rate to maintain reflux without the application of heat. After the addition, refluxing is continued for 2 hours and then the reaction mixture is permitted to sit overnight. Additional ligroin is added to facilitate the filtering off of the magnesium chloride. The solution of divinylaluminum chloride prepared in this manner is added to p-vinylphenylmagnesium chloride previously prepared in tetrahydrofuran. The rate of the addition is such as to maintain gentle reflux, and reflux is continued for a period of 12 hours after the addition is complete. Upon cooling, pentane is added to hasten precipitation of the magnesium salts which are removed by filtration. The solvents are evaporated under vacuum followed by distillation under reduced pressure to provide the purified product.

*Example 24.—Tris-(p-Vinylphenyl)Aluminum*

To 3 moles of the Grignard reagent prepared from p-chlorostyrene in tetrahydrofuran is added a solution of 1 mole of aluminum trimethoxide in portions to maintain the reaction mixture at reflux temperatures throughout the addition. After the addition is completed, reflux is continued for 12 hours. Upon cooling, pentane is added, and the salts which deposit are removed by filtration. Removal of the solvents followed by distillation under extremely high vacuum affords purified tris-(p-vinylphenyl)aluminum.

*Example 25.—Tris-(p-Vinylphenyl)Boron*

By replacing the aluminum trimethoxide of Example 24 with methylborate, tris-(p-vinylphenyl)boron is obtained.

*Example 26.—Tris-(p-Vinylphenyl)Boron*

By replacing the aluminum trimethoxide of Example 24 with boron triphenylate, tris-(p-vinylphenyl)boron is obtained.

*Example 27.—Tris-(o-Vinylphenyl)Boron*

Boron trichloride (0.33 mole) is dissolved in tetrahydrofuran. The solution thus prepared is added slowly with stirring to tetrahydrofuran containing 1 mole of o-vinylphenylmagnesium chloride. The mixture is stirred for 3 hours after the addition is completed at reflux temperature. Tris-(o-vinylphenyl)boron is isolated from the reaction mixture.

*Example 28.—Di-p-Vinylphenylphenylaluminum*

One mole of aluminum triethoxide is reacted with 1 mole of phenyl magnesium chloride in tetrahydrofuran solution to prepare phenylaluminum diethoxide. To the reaction mixture is then added a solution containing 2 moles of p-vinylphenylmagnesium chloride in tetrahydrofuran. The reaction mixture is heated to reflux temperature for a period of about 10 hours. Upon cooling, pentane is added and the salts which precipitate are removed by filtration. The solvents are removed by distillation at reduced pressure. The di-p-vinylphenylphenylaluminum is recovered from the residue by distillation under high vacuum.

*Example 29.—p-Vinylphenyldimethylboron*

Two moles of methylmagnesium chloride are added to a tetrahydrofuran solution containing 1 mole of triphenyl borate. The reaction mixture is refluxed for 3 hours, and then cooled to room temperature. A solution of 1 mole of p-vinylphenylmagnesium chloride in tetrahydrofuran is then added slowly to the solution of dimethylboron phenoxide thus prepared. Reflux temperature is then maintained for a period of about 6 hours. After the mixture has cooled, pentane is added to precipitate salts from solution and these are removed by filtration. The filtered solution of product is distilled to remove the solvents, and the p-vinylphenyldimethylboron is separated from the residue by distillation under high vacuum.

*Example 30.—Tetra-p-Vinylphenylgermanium*

A solution of 2.5 moles of p-vinylphenylmagnesium chloride in 541 g. of tetrahydrofuran is fed over 1½ hours into a flask containing a solution of 107.2 g. (0.5 mole) of germanium tetrachloride in 2000 ml. of petroleum solvent (chiefly heptane and octane). A nitrogen atmosphere is maintained in the dropping funnel and in the reaction flask. External heat is used to keep the reaction mixture at about 90° C. (refluxing) during the addition and for about five hours thereafter. The mix is then poured into a large volume of water. The tetra-p-vinylphenylgermanium is separated from the organic and aqueous layers by appropriate techniques.

*Example 31.—Tetra-p-Vinylphenyllead*

By following the procedure of Example 30 and using lead chloride in place of germanium chloride, tetra-p-vinylphenyllead is obtained.

*Example 32.—Tetra(2-Methyl-4-Vinylphenyl)Lead*

Two moles of 2-methyl-4-vinylphenylmagnesium chloride in excess N-methylmorpholine is added to 0.85 mole of lead chloride suspended in 2 liters of toluene. The mixture is then refluxed for about 2 hours. The solid material in the reaction product is removed by filtration, and the solvent then stripped off. The tetra(2-methyl-4-vinylphenyl)lead may be recrystallized from benzene.

The vinylphenylmetal compounds of the present invention are useful as additives incorporated in petroleum-type fuels and oils. They are also useful as monomers from which polymeric substances having a high metal content are obtained by heating with peroxide-type polymerization catalysts. Copolymerization of the vinylphenylmetal compounds with other ethylenically-unsaturated polymerizable materials, such as styrene, vinyl acetate, vinyl chloride, butadiene, acrylates, and other unsaturated esters, by processes generally used in the art for copolymerizing vinylic materials, gives unique, metal-containing polymers useful in the plastic fabricating industries.

While the invention has been described with particular reference to specific embodiments, it is to be understood that it is not limited thereto, but is to be construed broadly and restricted solely by the scope of the appended claims.

What is claimed is:

1. A vinylphenylmetal compound having the formula $V_aMZ_{y-a}$ wherein M is a metal atom selected from the class consisting of beryllium, zinc, cadmium, mercury, boron, aluminum, germanium, lead, phosphorus, arsenic, antimony and bismuth; V is a vinyl-substituted phenyl radical bonded directly to said metal M through a carbon atom of the phenyl ring, said phenyl radical being otherwise inertly substituted; Z is a radical selected from the class consisting of halogen, alkoxy, aryloxy and alkyl and aryl hydrocarbon radicals; $y$ is the valence of the metal atom M; and $a$ is an integer from 1 to $y$.

2. Bis(vinylphenyl)cadmium.
3. Tris(vinylphenyl)aluminum.
4. Tris(vinylphenyl)phosphorus.
5. Tris(vinylphenyl)arsenic.
6. Tris(vinylphenyl)antimony.
7. Bis(vinylphenyl)mercury.
8. A compound according to claim 1 wherein the metal atom, M, is bismuth.
9. A compound according to claim 1 wherein the metal atom, M, is antimony.
10. A process for preparing vinylphenylmetal compounds which comprises reacting a metal compound selected from the class consisting of metal halides, metal alkoxides, metal aryloxides, hydrocarbon metallic halides, hydrocarbon metallic alkoxides and hydrocarbon metallic aryloxides wherein the metal is selected from the class consisting of beryllium, zinc, cadmium, mercury, boron, aluminum, germanium, lead, phosphorus, arsenic, antimony and bismuth; with at least an equimolar amount of a vinylphenyl magnesium chloride; said reaction being carried out in the presence of a cyclic ether selected from the class consisting of tetrahydrofurans, tetrahydropyrans, dihydropyrans, tetrahydrofurfuryl ethers and N-alkylmorpholines; the amount of cyclic ether being at least molecularly equal to the amount of vinylphenylmagnesium chloride used.

11. A process according to claim 10 wherein the reaction is carried out in the presence of a mixture of cyclic ether and an inert hydrocarbon solvent.

12. A process according to claim 10 wherein the cyclic ether is tetrahydrofuran.

13. A process according to claim 10 wherein the vinylphenylmagnesium chloride is p-vinylphenylmagnesium chloride.

14. A process according to claim 10 wherein the metal compound is a metal chloride.

15. A process according to claim 10 wherein the molar amount of vinylphenylmagnesium chloride used is equivalent to the sum of all the halide, alkoxide and aryloxide groups of the metal compound.

16. A process according to claim 13 wherein the metal compound is phosphorus trichloride.

17. A process according to claim 13 wherein the metal compound is arsenic trichloride.

18. A process according to claim 13 wherein the metal compound is antimony trichloride.

19. A process according to claim 13 wherein the metal compound is aluminum chloride.

20. A process according to claim 13 wherein the metal compound is boron trichloride.

21. A process according to claim 13 wherein the metal compound is mercuric chloride.

22. Tris(vinylphenyl)bismuth.

References Cited in the file of this patent

UNITED STATES PATENTS

| | | |
|---|---|---|
| 2,058,373 | Weissenborn | Oct. 20, 1936 |
| 2,508,022 | Gluesenkamp | May 16, 1950 |

OTHER REFERENCES

JACS 61 (1939), pp. 957–959.

Kharasch et al.: "Grignard Reactions of Nonmetallic Substances," (1954) New York, pp. 24, 50 and 1336.

Chemical Reviews, vol. 2 (1925–1926) pp. 62 and 63.